United States Patent [19]

Baumgartner et al.

[11] E Re. 28,468

[45] Reissued July 8, 1975

[54] CABLE SHIELD CONNECTOR

[75] Inventors: Robert Garland Baumgartner, Baltimore, Md.; Harry James Graff, Somerville, N.J.

[73] Assignee: Bell Telephone Laboratories Incorporated, Murray Hill, N.J.

[22] Filed: May 2, 1974

[21] Appl. No.: 466,381

Related U.S. Patent Documents

Reissue of:

[64] Patent No.: 3,757,269
Issued: Sept. 4, 1973
Appl. No.: 181,030
Filed: Sept. 16, 1971

[52] U.S. Cl. ..... 339/14 L; 174/88 R; 339/95 R; 339/263 R

[51] Int. Cl. ..... H01r 3/06

[58] Field of Search ..... 339/14, 95, 97–99, 339/263; 174/78 R, 88 R, 88 C

[56] References Cited

UNITED STATES PATENTS

| | | | |
|---|---|---|---|
| 2,304,711 | 12/1942 | Shenton | 339/95 R |
| 3,058,087 | 10/1962 | Piasecki | 339/95 R |
| 3,253,247 | 5/1966 | Vos | 339/95 R |
| 3,435,126 | 3/1969 | Hamilton | 339/95 R |
| 3,499,972 | 3/1970 | Smith | 339/95 R |
| 3,654,584 | 4/1972 | Gillemot et al. | 339/14 R |
| 3,676,836 | 7/1972 | Gillemot et al. | 339/97 R |
| 3,701,839 | 10/1972 | Smith | 339/14 R |

*Primary Examiner*—Joseph H. McGlynn
*Attorney, Agent, or Firm*—A. D. Hooper

[57] ABSTRACT

A cable shield connector for providing electrical shield continuity at splice points or terminals utilizes contoured plates between which the shield and plastic outer jacket of the cable section are clamped. The inner plate has an upstanding tang or tab on one end thereof and an upwardly protruding threaded stud spaced from the tab. The other end of the inner plate is slipped beneath the shield and an outer plate is mounted on the [ sud ] *stud* over the exterior of the plastic jacket. As the plates are forced toward each other, the outer plate first contacts the tab and tends to pivot thereabout tightly clamping the shield and jacket between the ends of the plates. The inner plate can have an insulating layer on the underside thereof to prevent shorting of the cable conductors to the cable shield if damage occurs to the conductor insulation.

9 Claims, 2 Drawing Figures

CABLE SHIELD CONNECTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to electrical connectors and more particularly to cable connectors for providing cable shield continuity at cable splice points and terminals.

2. Description of the Prior Art

Cable systems normally contain a plurality of discrete cable sections which are joined together at splice points and which are joined to other apparatus at terminal points. Each of these discrete cable sections comprises a core of conductors within protective sheaths normally including an electrical shield and an outer protective plastic jacket. At splice points and terminals it is necessary to insure continuity of the electrical shield for proper electrical protection of the conductors.

One type of connector for providing electrical shield continuity clamps directly onto the thin shield alone. However, such connectors tear or damage the thin conductive shield and thereby lose their effectiveness.

Another type of connector for providing shield continuity comprises a base which fits beneath the shield and has a stud protruding outwardly through a slit in the shield and outer jacket. An outer bridge is mounted on the stud to clamp the shield and jacket between the base and the bridge. A major disadvantage of such connectors is the necessity for slitting or tabing the cable shield and outer jacket to allow the stud to protrude. The slitting step adds considerably to the cost of installing such connectors. Further, the slitting step often results in cuts or damage to the insulation on the cable conductors thereby causing these conductors to be shorted to the cable shield. Additionally the slit cannot be completely closed after the connector is installed because of the stud protruding therethrough. Thus the shield is not in contact with the inner plate over a substantial portion of its surface and thereby an increase in contact resistance is produced.

Accordingly, it is an object of this invention to eliminate the necessity for slitting the cable shield and jacket for installing cable shield connectors.

Another object is to improve cable shield connectors to prevent damage to the cable shield.

A further object is to improve cable shield connectors to provide better electrical contact with the shield simultaneous with a mechanically stronger connection.

A still further object is to increase the contact area between the connector and cable shield to thereby decrease the contact resistance.

SUMMARY OF THE INVENTION

The foregoing objects and others are achieved in accordance with the principles of this invention by the use of a connector comprising contoured plates between the ends of which the electrical shield and plastic jacket of the cable are clamped. The inner plate of the connector has an upstanding tang or tab on one end thereof and an outwardly protruding threaded stud spaced from the tab. The opposite end of the inner plate is slipped beneath the shield until the stud contacts the ends of the shield and jacket. The outer plate is inserted on the stud over the jacket and forced toward the inner plate by a nut. The outer plate first contacts the upstanding tab of the inner plate and tends to pivot thereabout causing the other ends of the plates to tightly clamp the shield and jacket therebetween. The tightening action also imparts a force component to the inner plate which keeps it securely wedged under the shield. The inner plate contacts the shield over the entire portion thereof which is inserted in the cable to thereby provide a low resistance connection. The lower surface of the inner plate is coated with an insulation to prevent any shorting of conductors to the cable shield in the event of damage to the conductor insulation.

BRIEF DESCRIPTION OF THE DRAWINGS

The invention will be more fully comprehended from the following detailed description and accompanying drawing in which.

DETAILED DESCRIPTION

Figure 1:
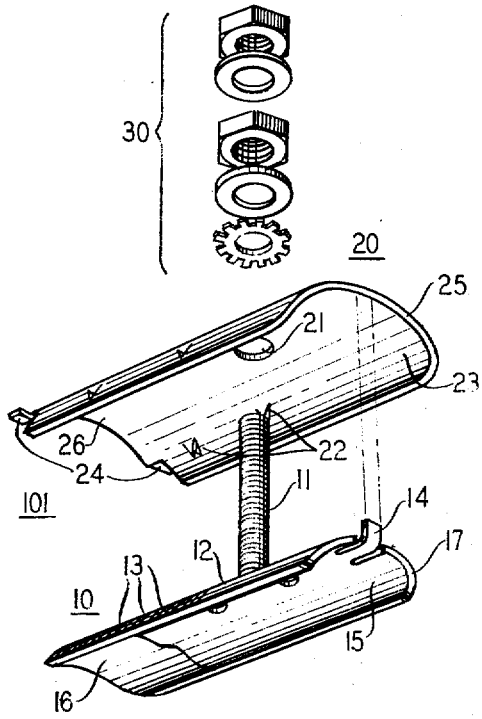
FIG. 1 is an exploded perspective view of a cable shield connector.

FIG. 1 shows in detail a cable shield connector 101 in accordance with the principles of this invention. Connector 101 comprises an inner plate 10, an outer plate 20 and mounting hardware 30 such as nuts and washers for mounting plates 10 and 20 together. Plates 10 and 20 are contoured to approximately match the contour of the shield and jacket of the cable, respectively.

Inner plate 10 has a threaded stud 11 integrally fastened thereto by some method such as welding and projecting upwardly from the upper surface 12 thereof. Upper surface 12 also has a plurality of serrations 13 or other projections to insure good electrical contact with the cable shield when the connector is installed. On one end 17 of plate 10 is an upstanding tab or tang 14 which is integrally formed as part of plate 10. Tang 14 advantageously can have a slight angle backward from a plane perpendicular to surface 12 so that a force applied to the top edge of tang 14 will have a component parallel to surface 12 for reasons to become apparent subsequently. The height of tang 14 advantageously can be greater than the combined thicknesses of the jacket and shield of the cable on which connector 101 is installed. On the bottom of plate 10 is an insulating layer 15 which prevents plate 10 from shorting the cable shield to the conductors in the event of damage to the insulation of the conductors when connector 101 is installed.

Outer plate 20 has an opening 21 through which stud 11 on plate 10 is inserted. The inner surface of plate 20 has a plurality of sharp projections or tangs 22 for insuring a good mechanical bond to the plastic jacket of the cable over which plate 20 is installed. Plate 20 has a length sufficient to insure that tang 14 on plate 10 firmly contacts the inner surface 23 of plate 20 on one end 25 thereof when plate 20 is installed on stud 11. The inner surface 23 of plate 20 can have a notch or groove, not shown, in which tang 14 fits to prevent any slippage of plate 20 with respect to tang 14 after installation. Plate 20 also has two upstanding tabs 24 on the other end 26 thereof for retaining a cable clamp on connector 101 should it become desirable to install such a clamp around the cable.

Figure 2:
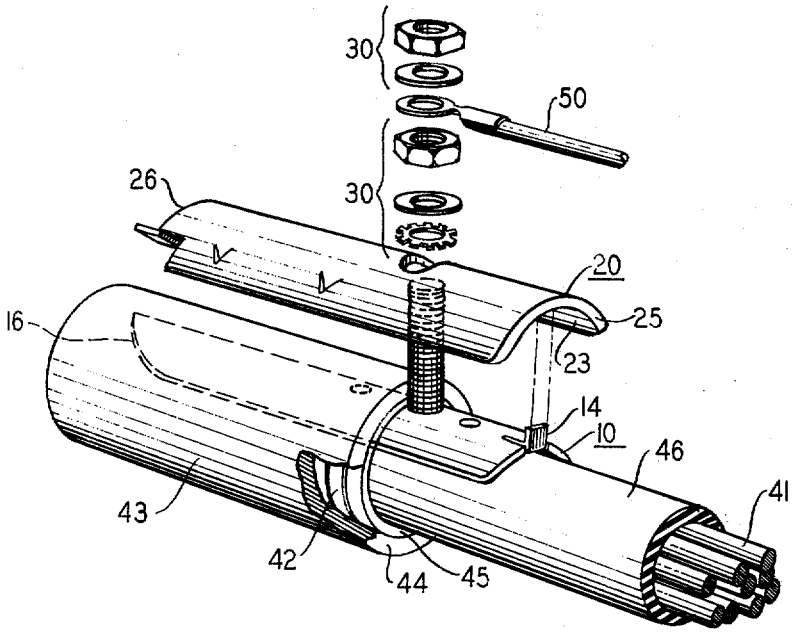
FIG. 2 is an exploded perspective view showing the connector of FIG. 1 installed on a cable.

In FIG. 2, where like numbers refer to like elements, an exploded view of connector 101 of FIG. 1 installed on a cable 40 is shown. Inner plate 10 is slid between conductors 41 and shield 42 until stud 11 butts against the ends 44 and 45 of outer plastic jacket 43 and shield 42 respectively. A plastic sheath 46 is shown surrounding conductors 41 but can readily be omitted. No slit or incission need be made in jacket 43 or shield 42 as is required in prior art cable connectors. Outer plate 20 is installed over jacket 43 and a portion of mounting hardward 30 is then installed on stud 11. As hardware 30 is tightened, the inner surface 23 on end 25 of plate 20 first contacts tang 14. As hardware 30 is further tightened plate 20 pivots about tang 14 thereby forcing end 26 of plate 20 and end 16 of plate 10 tightly together and clamping shield 42 and jacket 43 therebetween. The large clamping forces prevent plate 10 from slipping from beneath shield 42. Furthermore, the force applied to tang 14 by outer plate 20 can include a component parallel to the cable axis which tends to keep plate 10 shoved beneath shield 42. The relative magnitude of this component depends on the angle of incline of tang 14 with respect to a plane perpendicular to surface 12. An appropriate conductor 50 is then mounted on stud 11 with another portion of hardware 30 and electrically connects shield 42 across a splice point or to a terminal.

Previously, cable shield connectors could not be used without slitting the cable jacket and shield. Such connectors had no tang such as tang 14 which made initial contact with the outer plate and about which the outer plate pivoted. Tabs or tangs similar in appearance to tang 14 have been previously used on the inner plates of cable connectors but such tabs were used for facilitating insertion of the inner plate only. Such tabs extended beyond the end of the outer plate and made no contact therewith. Therefore, if one of these previous connectors were utilized with the stud only abutting the ends of the jacket and shield as shown with respect to the instant connector instead of protruding through a slit in the shield, the outer plate thereof would pivot about the end of the jacket in a direction opposite to the pivoting of the outer plate of the connector of this invention. Thus there would be no clamping of the jacket and shield between the inner and outer plate as required.

The elimination of the necessity for slitting the cable shield and jacket greatly reduces the time required for installing connector 101. Additionally, the danger of damage to the insulation of conductors 41 or sheath 46 from the sharp cutting tools required for slitting is eliminated. The elimination of the slit also increases the contact area between shield 42 and inner plate 10 thereby resulting in better connection with lower contact resistance. In previous contours the slit could not be completely closed after the insertion of the inner plate because of the stud protruding therethrough. Thus the portion of the inner plate directly beneath the slit made no contact with the shield.

Various modifications such as varying the numbers and configurations of the projecting tangs can be made without departing from the spirit and scope of the invention.

What is claimed is:

1. A connector assembly for providing electrical connection to the shield of a cable having a plurality of conductors within said shield and a protective jacket overlaying said shield, with said shield and said jacket having discontinuity therein to form ends, comprising, in combination:

a first plate of conductive material having top and bottom surfaces and first and second ends, said plate having an upstanding tang on said second end thereof;

a threaded stud mounted on said first plate and extending upwardly therefrom; said first plate adapted to have said first end inserted into said cable in contact with said shield so that said stud abuts said ends and said second end extends away from said ends along said cable [ , ] ;

a second plate having top and bottom surfaces and having first and second ends corresponding to said first and second ends of said first plate and adapted for installation on said stud over the exterior of said jacket; and mounting means engaging said stud for forcing said second plate toward said first plate to cause said second end of said second plate to contact said tang causing said second plate to pivot thereabout so that said first ends of said first and second plates clamp together whereby said jacket and said shield can be clamped between said first ends when said assembly is installed on said cable.

2. Apparatus in accordance with claim 1 wherein said tang is inclined from a plane perpendicular to the top surface of said first plate so that said second plate imparts a force to said tang having a component parallel to said top surface thereby holding said first end of said first plate within said cable.

3. Apparatus in accordance with claim 1 wherein the bottom surface of said first plate has an insulating layer thereon to prevent shorting of said conductors to said shield in the event of damage to said conductors.

4. Apparatus in accordance with claim 1 wherein said first and second plates include a plurality of projections on the top and bottom surfaces, respectively, for insuring electrical and mechanical contacts with said shield and said jacket, respectively.

5. Apparatus in accordance with claim 1 wherein said bottom surface of said second plate includes a groove which engages said tang when said plates are forced together to prevent said tang from moving with respect to said second plate.

6. Apparatus in accordance with claim 1 wherein said tang has an upstanding height greater than the thickness of said shield and said jacket to cause said tang to contact said bottom surface of said second plate before said second end of said second plate contacts said jacket.

7. Apparatus in accordance with claim 1 wherein said first and second plates are transversely curved to conform to the shape of said shield and said jacket, respectively.

8. In combination, a cable and a shield connector for said cable comprising:

an electrical cable having a shield and an outer protective jacket overlaying said shield, said shield and said jacket being removed from a portion of said cable so as to form ends of said shield and said jacket, said ends being continuous about a circumference of said cable;

a first plate having a threaded stud mounted thereon, said plate having one end thereof inserted into said cable in contact with said shield so that said stud abuts said ends of said shield and jacket, said first plate having the other end thereof extending along said cable away from said ends of said shield and said jacket and having an upstanding tang on said other end thereof;

a second plate mounted on said stud over said jacket; and mounting means forcing said second plate toward said first plate so that one end of said second plate contacts said tang causing said second plate to pivot thereabout and clamp said shield and said jacket between said one end of said first plate and the other end of said second plate.

*9. A connector assembly for providing electrical connection to the shield of a cable having a plurality of conductors within a shield and a protective jacket overlaying said shield, said shield and said jacket having a combined thickness and having discontinuities therein to form ends, comprising in combination:*

*a first plate of conductive material having top and bottom surfaces and first and second ends;*

*a threaded stud mounted on said first plate and extending upward therefrom, said first plate adapted to have said first end inserted into said cable in contact with said shield so that said stud abuts said ends of said jacket and shield and said second end extends away from said ends along said cable;*

*a second plate having top and bottom surfaces and having first and second ends corresponding to said first and second ends of said first plate and adapted for installation on said stud over the exterior of said jacket;*

*mounting means engaging said stud for forcing said second plate toward said first plate; and*

*a tang on said second end of one of said plates oriented at substantially a right angle with respect to said surfaces of said one plate, said tang having a height greater than said combined thickness and being adapted for contacting said second end of the other of said plates when said second plate is forced toward said first plate to provide a pivot on said second ends so that said first ends clamp together whereby said jacket and said shield can be clamped between said first ends when said assembly is installed on said cable.*

* * * * *